US012801446B2

(12) United States Patent
Agarwal et al.

(10) Patent No.: US 12,801,446 B2
(45) Date of Patent: Nov. 17, 2026

(54) DATA STORAGE DEVICE AND METHOD FOR DYNAMIC FLASH INTERFACE MODULE (FIM) LOAD BALANCING FOR MEMORY DIE SHARING

(71) Applicant: Sandisk Technologies, Inc., Milpitas, CA (US)

(72) Inventors: Dinesh Kumar Agarwal, Bangalore (IN); Alap Yogeshbhai Vyas, Bangalore (IN); Mikhail Palityka, Oakville, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 420 days.

(21) Appl. No.: 18/610,423

(22) Filed: Mar. 20, 2024

(65) Prior Publication Data

US 2025/0298663 A1 Sep. 25, 2025

(51) Int. Cl.

*G06F 9/50* (2006.01)
*G06F 3/06* (2006.01)
*G06F 9/48* (2006.01)

(52) U.S. Cl.

CPC ............ *G06F 9/505* (2013.01); *G06F 3/0601* (2013.01); *G06F 3/061* (2013.01); *G06F 3/0635* (2013.01); *G06F 3/0659* (2013.01); *G06F 3/0679* (2013.01); *G06F 9/4881* (2013.01); *G06F 9/5038* (2013.01); *G06F 9/5016* (2013.01)

(58) Field of Classification Search

None

See application file for complete search history.

(56) References Cited

U.S. PATENT DOCUMENTS 11,199,996 B2 12/2021 Seo
11,513,976 B2 11/2022 Vaysman et al.
2016/0092117 A1 3/2016 Ramalingam et al.
2021/0124705 A1 4/2021 Zhai et al.
2022/0308769 A1 9/2022 Muthiah et al.
2024/0069721 A1 * 2/2024 Sankaranarayanan ....................... G06F 13/1657

* cited by examiner

*Primary Examiner* — Qing Yuan Wu
(74) *Attorney, Agent, or Firm* — Crowell & Moring LLP

(57) ABSTRACT

A data storage device can have a memory with one or more memory dies. The data storage device can also have one or more backend modules (e.g., flash interface modules (FIMs)) that send sense/transfer or program operations to the memory dies. In some situations, there can be more memory dies than FIMs. Using a fixed allocation between memory dies and FIMs in this situation can result in an inefficient pipeline of memory commands, where some FIMs are idle while other FIMs are busy. In one embodiment, the FIMs are dynamically allocated to the memory dies to provide a more-efficient workload distribution. Other embodiments are provided.

17 Claims, 10 Drawing Sheets

DATA STORAGE DEVICE AND METHOD FOR DYNAMIC FLASH INTERFACE MODULE (FIM) LOAD BALANCING FOR MEMORY DIE SHARING

BACKGROUND

A data storage device can have a memory with one or more memory dies. The data storage device can also have one or more backend modules (e.g., flash interface modules (FIMs)) that send sense/transfer or program operations to the memory dies.

DETAILED DESCRIPTION

The following embodiments generally relate to a data storage device and method for dynamic flash interface module (FIM) load balancing for memory die sharing. In one embodiment, a method is provided that is performed in a data storage device comprising a plurality of memory dies and a plurality of backend modules, wherein there are more memory dies than backend modules. The method comprises: creating a dynamic allocation between at least some of the plurality of backend modules and at least some of the plurality of memory dies based on a workload of memory operations; and providing the workload of memory operations to the plurality of backend modules per the dynamic allocation; wherein the dynamic allocation more-evenly distributes the workload of memory operations among the plurality of backend modules than when a fixed allocation is used that fixedly allocates a backend module to more than one memory die.

In another embodiment, a data storage device is provide comprising: a plurality of memory dies; a plurality of flash interface modules (FIMs), wherein a number of FIMs in the plurality of FIMs is fewer than a number of memory dies in the plurality of memory dies; a plurality of schedulers, wherein each scheduler is associated with a respective subset of FIMs and is configured to schedule a memory operation for a selected FIM in its respective subset of FIMs; and a plurality of selectors, wherein each selector is associated with a respective memory die of the plurality of memory dies, is further associated with respective a subset of FIMs, and is configured to select a FIM in the subset of FIMs for connection with the respective memory die.

In yet another embodiment, a data storage device is provided comprising: a plurality of memory dies; a plurality of backend modules, wherein there are fewer backend modules than memory dies; and means for dynamically allocating the plurality of backend modules to the plurality of memory dies to balance load among the plurality of backend modules.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
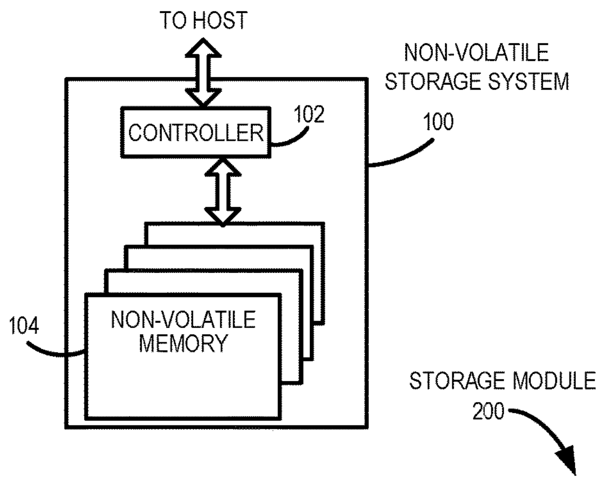
FIG. 1A is a block diagram of a data storage device of an embodiment.

Examples of data storage devices suitable for use in implementing aspects of these embodiments are shown in FIGS. 1A-IC. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
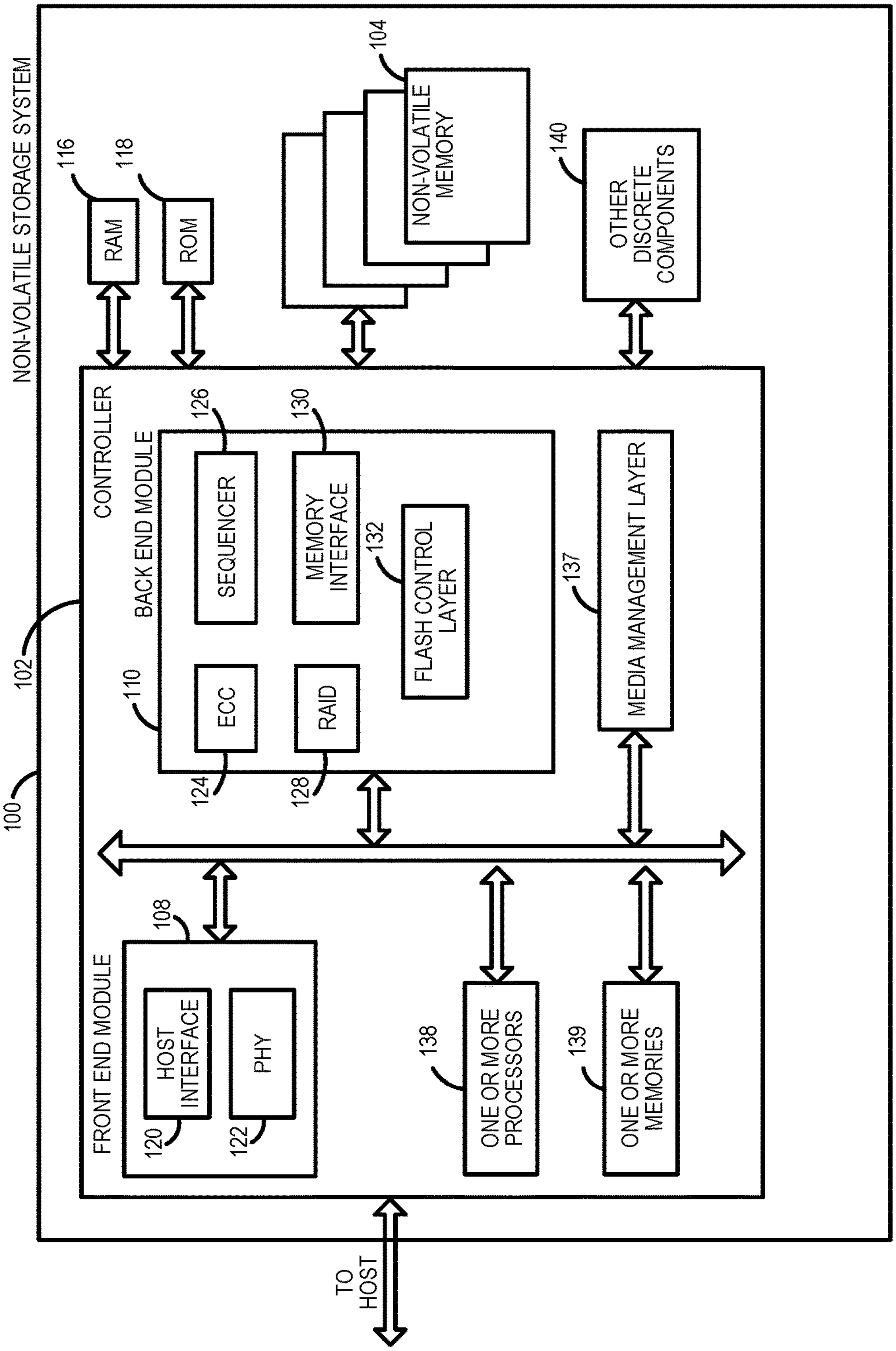
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

Figure 1B:
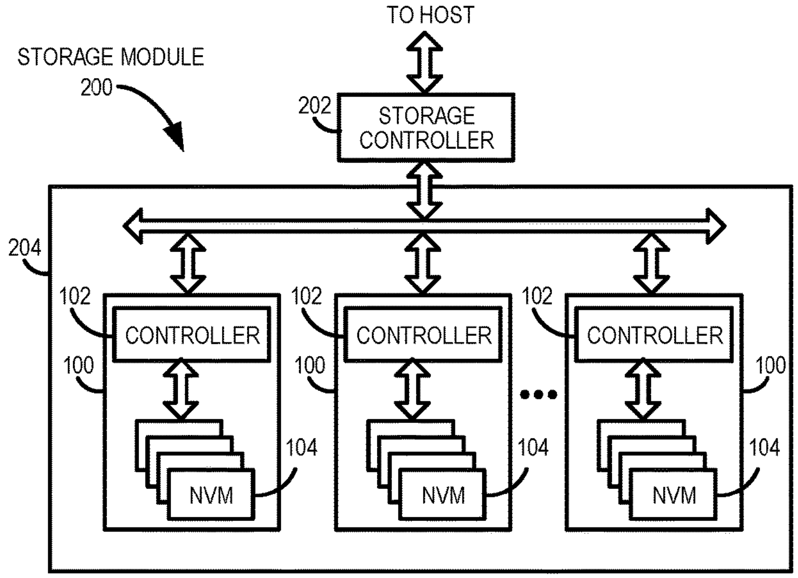
FIG. 1B is a block diagram illustrating a storage module of an embodiment.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

Figure 1C:
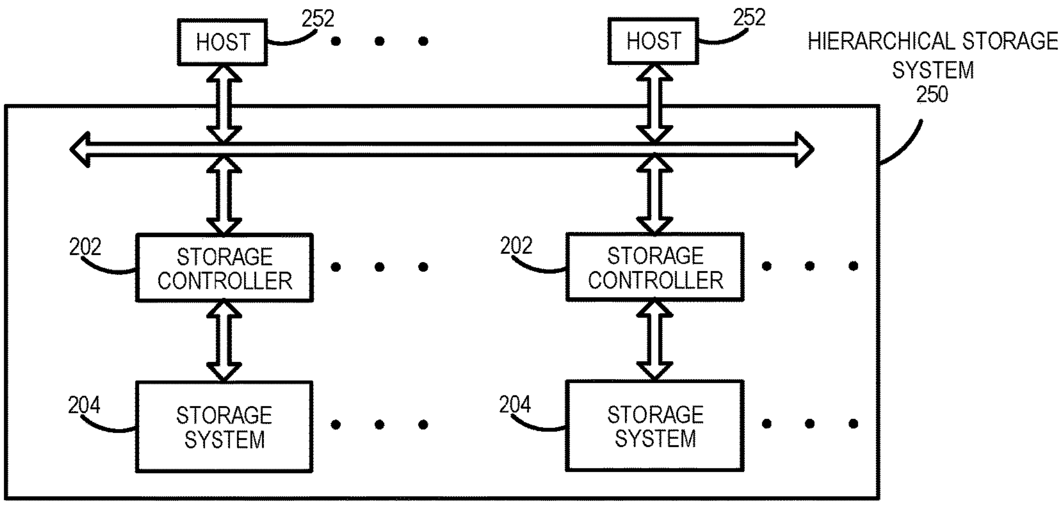
FIG. 1C is a block diagram illustrating a hierarchical storage system of an embodiment.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
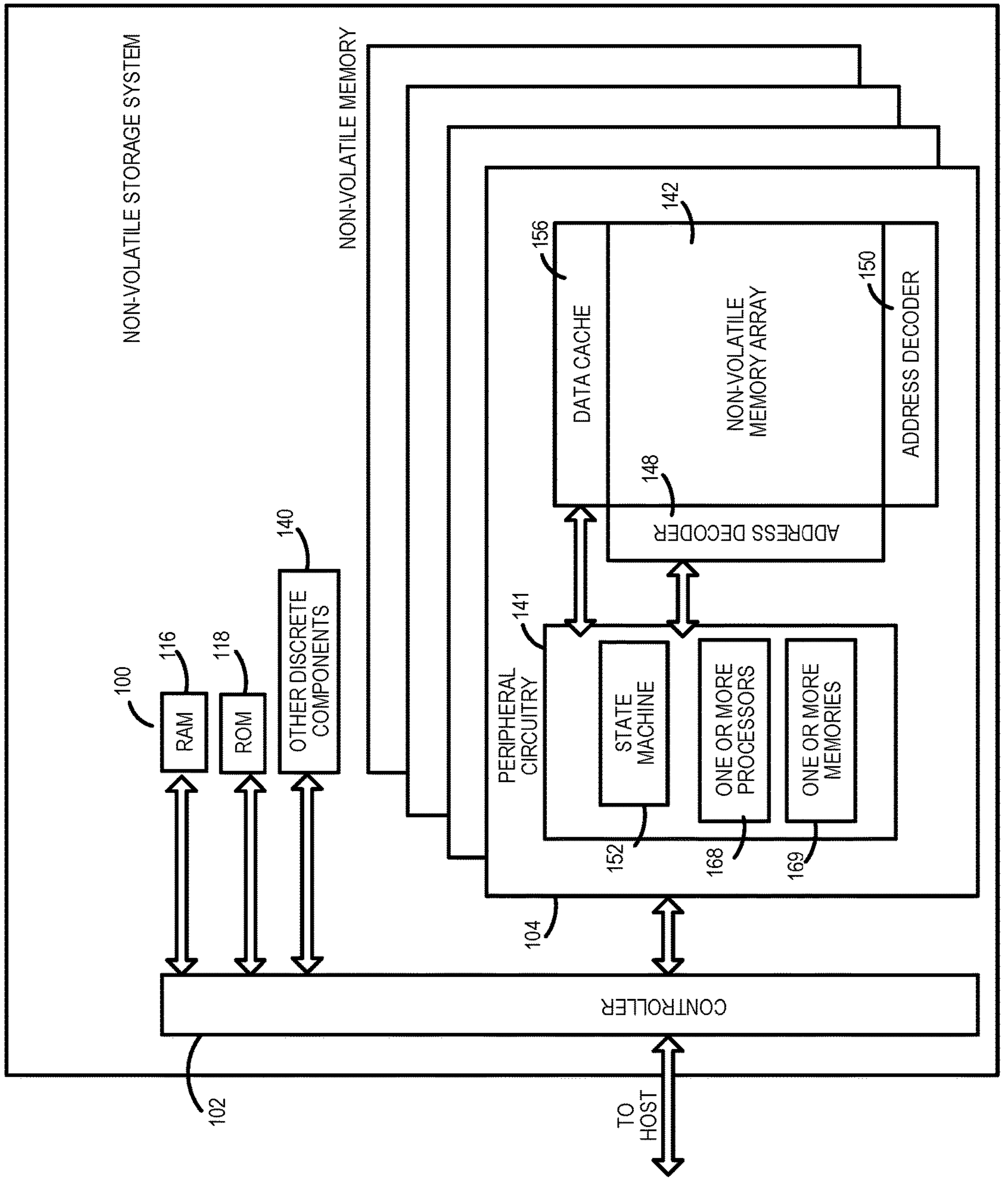
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL)) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
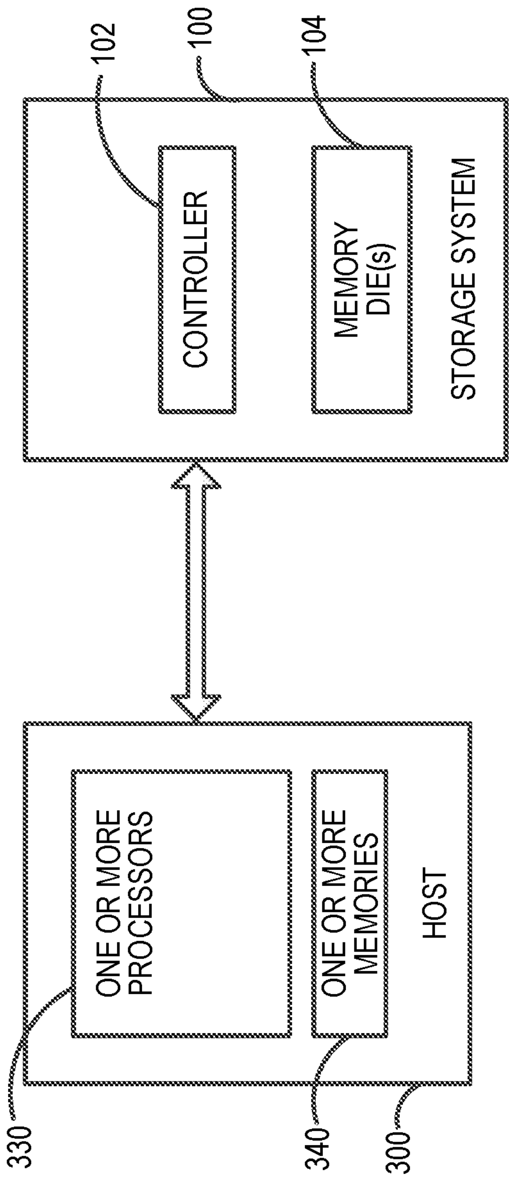
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, the data storage device 100 of this embodiment comprises a backend module 110 that sends sense/transfer or program operations to a memory die and can also perform other functions, such as, but not limited to, the back-end module functions noted above. In one example implementation described below, the backend module 110 comprises a flash interface module (FIM). However, these embodiments can be used with other types of backend modules. As such, it should be understood that the claims should not read to include a FIM unless expressly recited therein.

Figure 4:
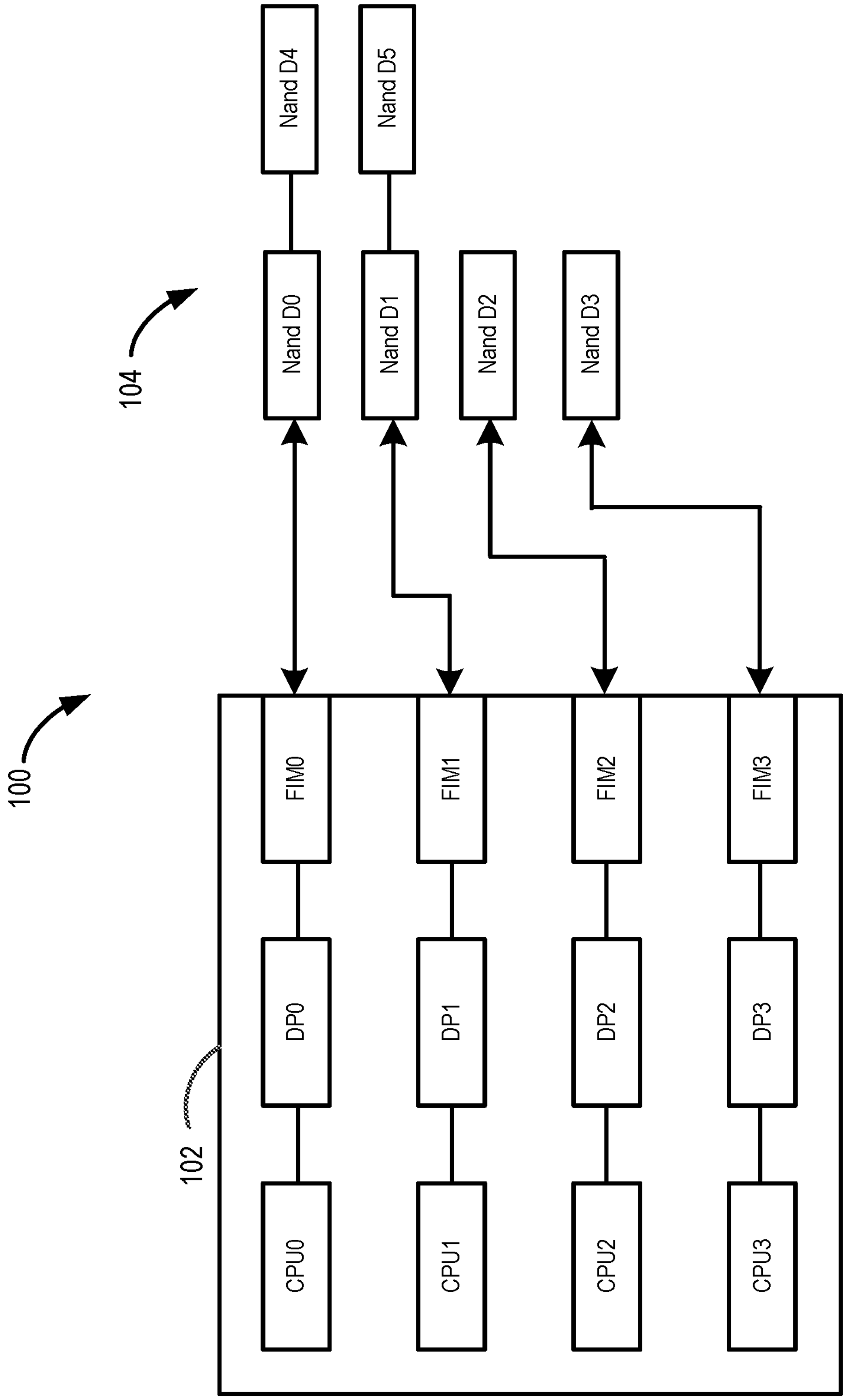
FIG. 4 is a block diagram of a data storage device of an embodiment in which there are more memory dies than flash interface modules (FIMs).

When the data storage device 100 has a memory 104 that comprises a plurality of memory dies, a plurality of FIMs can be used. However, in some data storage devices, there can be an imbalance (e.g., due to physical limitations or logical workloads) between the number of memory dies and the number of FIMs. As such, there can be a situation in which the data storage device 100 has more memory dies than FIMs. For example, FIG. 4 shows a situation in which the data storage device 100 has a memory 104 with six memory dies (D0-D5) but only four FIMs in the controller 102. (In this example, each FIM is associated with its own central processing unit (CPU) and data path in the controller 102). As a result, some FIMs (FIM0 and FIM1) are allocated to two memory dies, whereas the other FIMs (FIM2 and FIM3) are allocated only to a single memory die. This leads to an inefficient pipeline where the performance is limited by the worst-performing FIM. This problem is illustrated in FIG. 5, which shows FIM2 and FIM3 being idle in several cycles where FIM0 and FIM1 are fully active.

Figure 5:
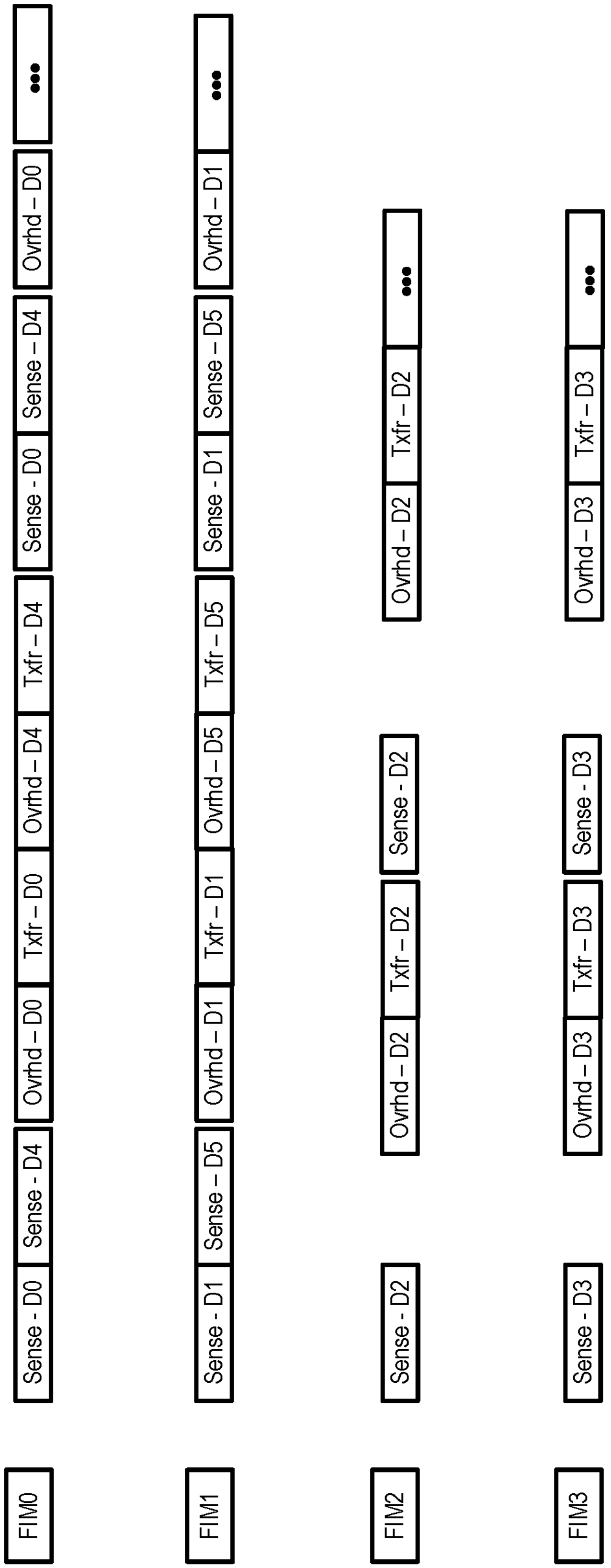
FIG. 5 is an illustration of an inefficient pipeline.
Figure 6:
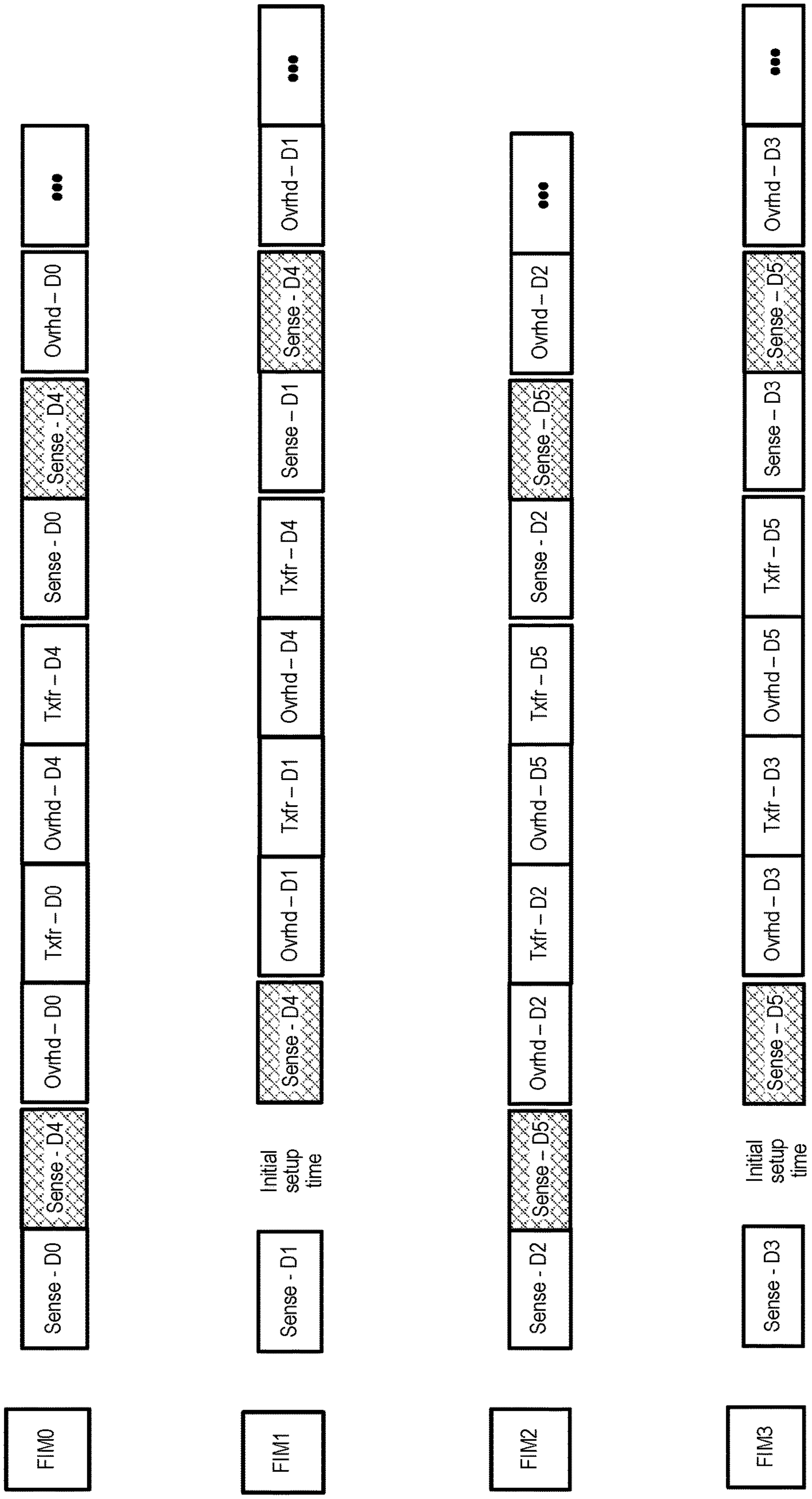
FIG. 6 is an illustration of an efficient pipeline provided by an embodiment.

To address this problem, one embodiment detects an imbalance at the FIM level and uses a dynamic map to map a memory die to a FIM, so that commands and data indicated to be used with a certain FIM can be transferred to the appropriate memory die to achieve a more-efficient pipeline (e.g., where all of the FIMs are better utilized as shown by a comparison between FIGS. 5 and 6). The dynamic map can be decided periodically and can be done at the command level.

In one embodiment, the controller 102 of the data storage device 100 can dynamically load a single memory die to multiple FIMs, use a dynamic map to tie a command to a FIM based on FIM loading, use a scheduler that indicates the best possible FIM to be used, use a selector to map the memory die to a specific FIM, and provide a mix of fixed and dynamic memory dies. Some memory dies can be made fixed and tied to specific FIMs, and some memory dies can be floating memory dies that have a default FIM, which can be dynamically changed in response to an indication from a scheduler.

Figure 7:
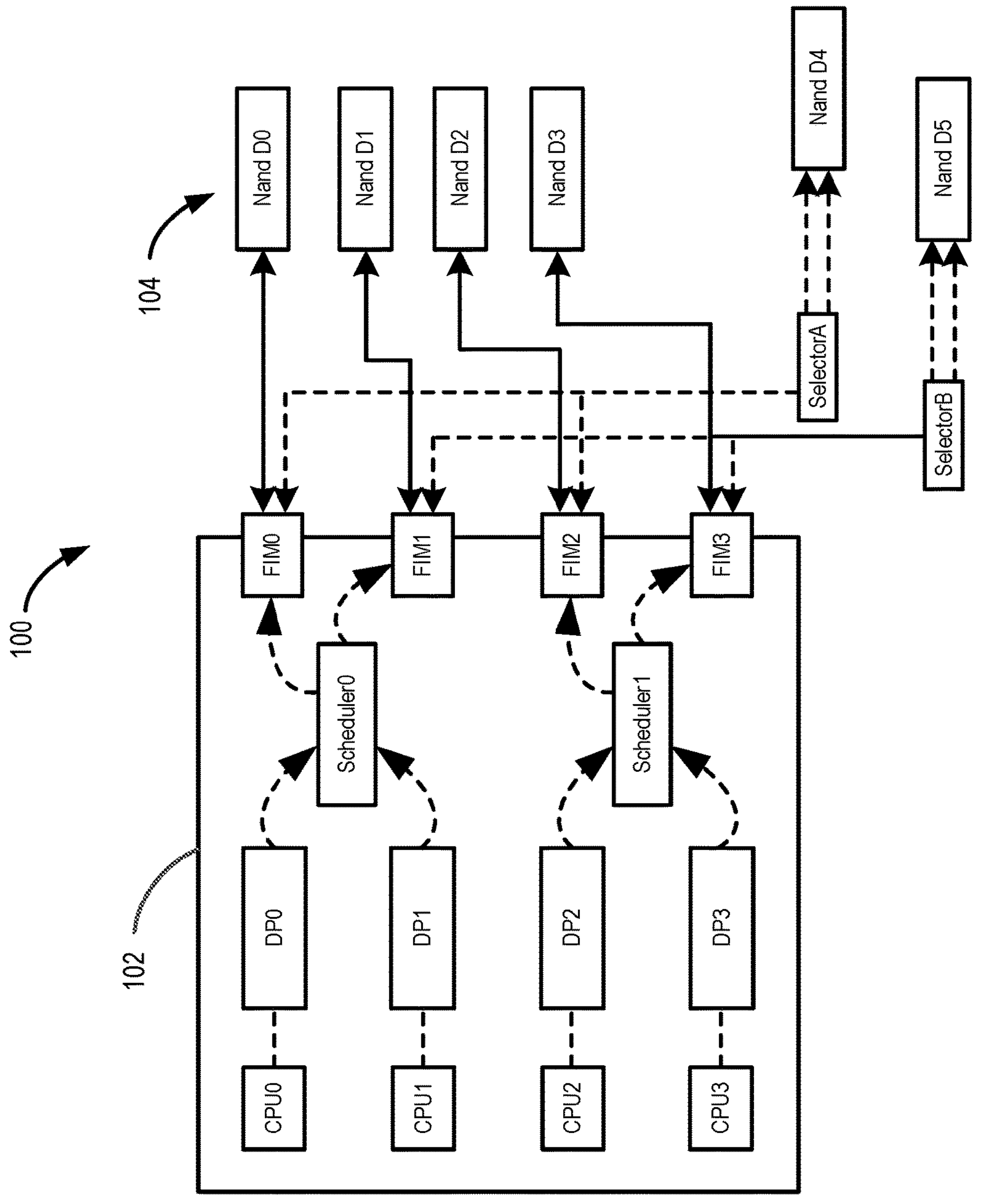
FIG. 7 is an illustration of a data storage device of an embodiment that provides dynamic FIM load balancing for memory die sharing.

An example of this embodiment is illustrated in FIG. 7. As shown in FIG. 7, the controller 102 in this example comprises two schedulers: Scheduler0 and Scheduler1. Each scheduler be implemented by one or more processors in the controller 102, individually or in combination, executing computer-readable program instructions. Some or all of the one or more processors can be the same as or different from the CPUs shown in the controller 102 in FIG. 7. One or both schedulers can also be implemented purely in hardware. Further, fewer or greater number of FIMs and memory dies can be used in other implementations.

The data storage device 100 in FIG. 7 also comprises two selectors: SelectorA and SelectorB, although a different number of selectors can be used. Each selector can be implemented by one or more processors in the data storage device 100, individually or in combination, executing computer-readable program instructions. Also, in this example, the selectors are shown outside of the controller 102, but, in other embodiments, at least one selector is part of the controller 102. The selectors external to the controller can be controlled by the controller 102.

Figure 8:
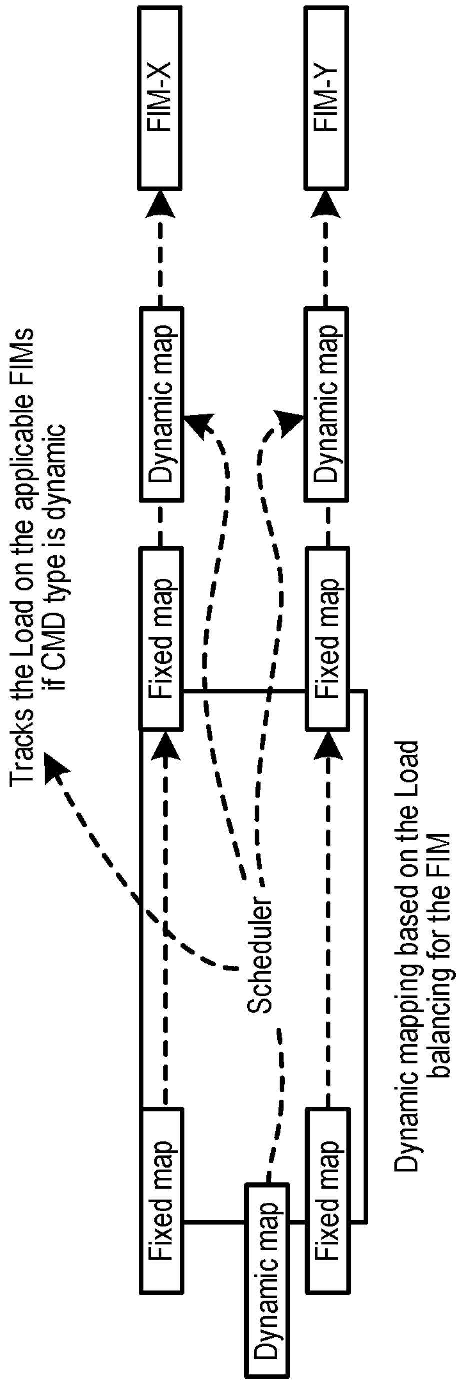
FIG. 8 is an illustration of the use of a dynamic map in a data storage device of an embodiment.
Figure 9A:
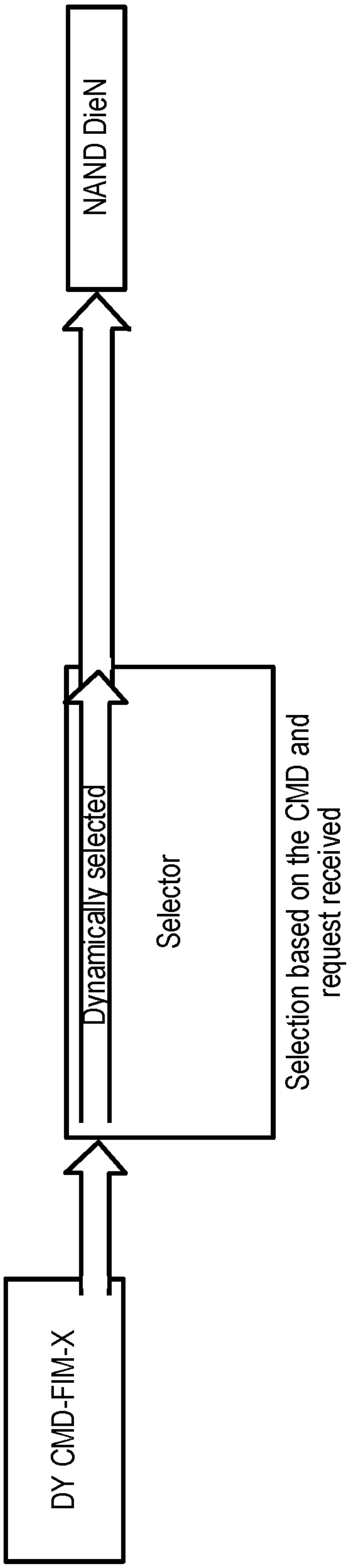
FIGS. 9A and 9B illustrate the use of a scheduler of an embodiment.
Figure 9B:
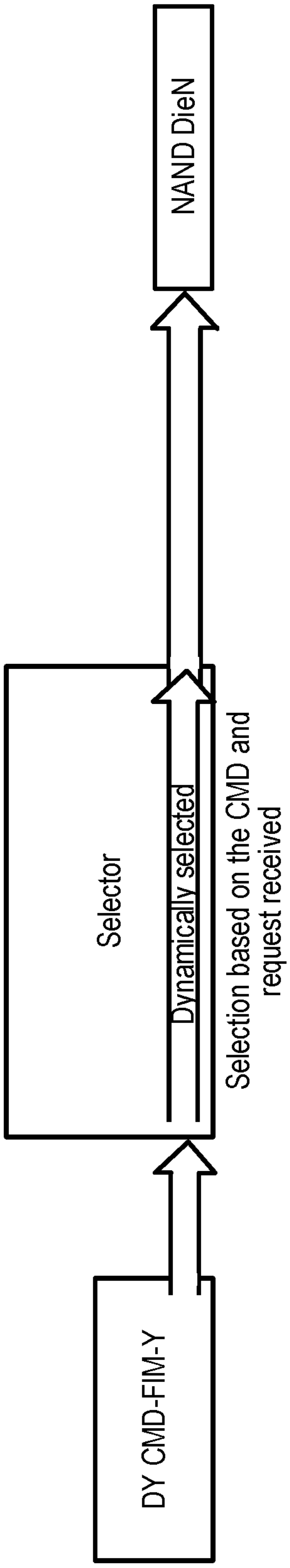

In this example, Scheduler0 determines which memory commands from CPU0 and CPU1 should be sent to FIM0 or FIM1. Similarly, Scheduler1 determines which memory commands from CPU2 and CPU3 should be sent to FIM2 or FIM3. SelectorA selects one of FIM0 and FIM2 to connect to memory die D4, and SelectorB selects one of FIM1 and FIM3 to connect to memory die D5. As shown in FIG. 8, the schedulers can make this determination using a dynamic map for tagging any command based on the associated memory die and corresponding FIM utilization. Based on the utilization, an indication of the best possible FIM can be sent to the selectors. Based on the indication from the selector, if the current indicated mapping is different from the default FIM, then the mapping of the memory die to a FIM can be changed to utilize the more-efficient or under-utilized FIM, as shown in FIGS. 9A and 9B. Without the efficient pipeline, all FIMs may not be utilized properly. As a result, sequential read performance for a given FIM can be limited. For example, if two FIMs are 100% utilized and two other FIMs are only 50% utilized, the resulting utilization of the overall FIM throughput available is only 75%. As shown in FIG. 6, by loading the FIMs dynamically, an efficient pipeline can be provided where the FIMs can be 100% utilized, and, thus, performance can increase in order of 25%.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. In a data storage device comprising a plurality of memory dies and a plurality of flash interface modules (FIMs), wherein there are more memory dies than FIMs, a method comprising:

using a scheduler associated with a respective subset of FIMs to create a dynamic allocation between the respective subset of FIMs and at least some of the plurality of memory dies based on a workload of memory operations; and using a selector associated with a respective memory die of the plurality of memory dies and further associated with the respective subset of FIMs to provide the workload of memory operations to the respective subset of FIMs per the dynamic allocation;

wherein the dynamic allocation more-evenly distributes the workload of memory operations among the plurality of FIMs than when a fixed allocation is used that fixedly allocates a FIM to more than one memory die.

2. The method of claim 1, wherein the dynamic allocation is created between all of the plurality of FIMs and all of the plurality of memory dies.

3. The method of claim 1, wherein at least one memory die of the plurality of memory dies is fixedly allocated to a respective at least one FIM of the plurality of FIMs, and wherein the dynamic allocation is for the memory dies that are not fixedly allocated.

4. The method of claim 1, wherein the dynamic allocation is created using a dynamic map.

5. The method of claim 1, wherein the dynamic allocation is created using a fixed map.

6. The method of claim 1, wherein at least one of the plurality of memory dies comprises a three-dimensional memory die.

7. A data storage device comprising:

a plurality of memory dies;

a plurality of flash interface modules (FIMs), wherein a number of FIMs in the plurality of FIMs is fewer than a number of memory dies in the plurality of memory dies;

a plurality of schedulers, wherein each scheduler is associated with a respective subset of FIMs and is configured to schedule a memory operation for a selected FIM in its respective subset of FIMs; and a plurality of selectors, wherein each selector is associated with a respective memory die of the plurality of memory dies, is further associated with respective a subset of FIMs, and is configured to select a FIM in the subset of FIMs for connection with the respective memory die.

8. The data storage device of claim 7, wherein the plurality of FIMs and the plurality of schedulers are part of a controller of the data storage device.

9. The data storage device of claim 8, wherein the controller further comprises a plurality of processors, wherein each processor is associated with and is configured to provide memory commands to a respective FIM via a respective path.

10. The data storage device of claim 7, wherein the plurality of schedulers are further configured to create a dynamic allocation between at least some of the plurality of FIMs and at least some of the plurality of memory dies based on a workload of memory operations.

11. The data storage device of claim 10, wherein the dynamic allocation provides a more-efficient pipeline of memory operations as compared to when a fixed allocation is used.

12. The data storage device of claim 7, wherein all of the plurality of memory dies are dynamically allocatable.

13. The data storage device of claim 7, wherein some, but not all, of the plurality of memory dies are dynamically allocatable.

14. The data storage device of claim 7, wherein the plurality of schedulers are further configured to use a dynamic map for scheduling.

15. The data storage device of claim 7, wherein the plurality of schedulers are further configured to use a fixed map for scheduling.

16. The data storage device of claim 7, wherein at least one of the plurality of memory dies comprises a three-dimensional memory die.

17. A data storage device comprising:

a plurality of memory dies;

a plurality of flash interface modules (FIMs), wherein there are fewer FIMs than memory dies;

means for using a scheduler associated with a respective subset of FIMs to create a dynamic allocation between the respective subset of FIMs and at least some of the plurality of memory dies based on a workload of memory operations; and means for using a selector associated with a respective memory die of the plurality of memory dies and further associated with the respective subset of FIMs to provide the workload of memory operations to the respective subset of FIMs per the dynamic allocation.

* * * * *